United States Patent
Cole

[11] 3,870,334
[45] Mar. 11, 1975

[54] SIDEWALK COASTER SLED
[76] Inventor: Kenneth E. Cole, 306 6th Pl., St. Elmo, Ill. 62458
[22] Filed: Nov. 5, 1973
[21] Appl. No.: 413,164

[52] U.S. Cl.................. 280/87.01, 188/20, 188/74
[51] Int. Cl............................................ B62b 11/00
[58] Field of Search .... 280/87.01, 88, 87.02, 87.03, 280/1.1, 1.11, 1.189, 7.1; 188/9, 20, 21, 74

[56] References Cited
UNITED STATES PATENTS

| 809,912 | 1/1906 | Ferris | 280/87.01 |
| 1,806,749 | 5/1931 | Ellis | 280/87.01 |
| 2,136,019 | 11/1938 | Pfau | 280/87.01 |
| 2,467,932 | 4/1949 | Foulke | 280/87.01 |
| 2,766,994 | 10/1956 | Ayers | 280/87.01 |
| 2,965,387 | 12/1960 | Brunzell | 280/87.01 |

Primary Examiner—David Schonberg
Assistant Examiner—R. Schrecengost
Attorney, Agent, or Firm—Marden S. Gordon

[57] ABSTRACT

A wheeled platform having a front pair of steerable wheels and a back pair of supporting wheels with a handle bar like mechanism attached to the front steerable wheel and projecting above the platform to be grasped in the hands of an individual riding on the coaster sled, and a pair of brakes each adapted to bear against the interior circumference of the hubs of the supporting wheels and operable by either one of a pair of handles disposed along each side of the vehicle at the front end portion thereof where the brake handles may be readily grasped by an individual's hand removed from the handle bars and gripping the brake lever to apply a selectable braking action simultaneously to the back pair of supporting wheels.

4 Claims, 5 Drawing Figures

PATENTED MAR 11 1975　　3,870,334
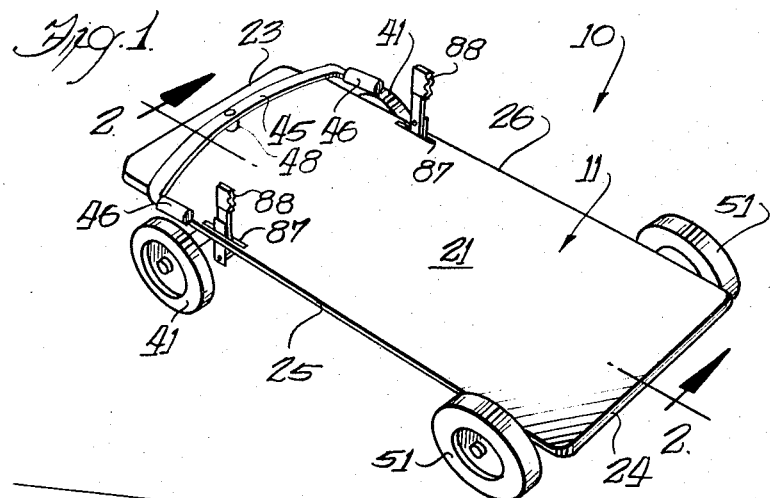
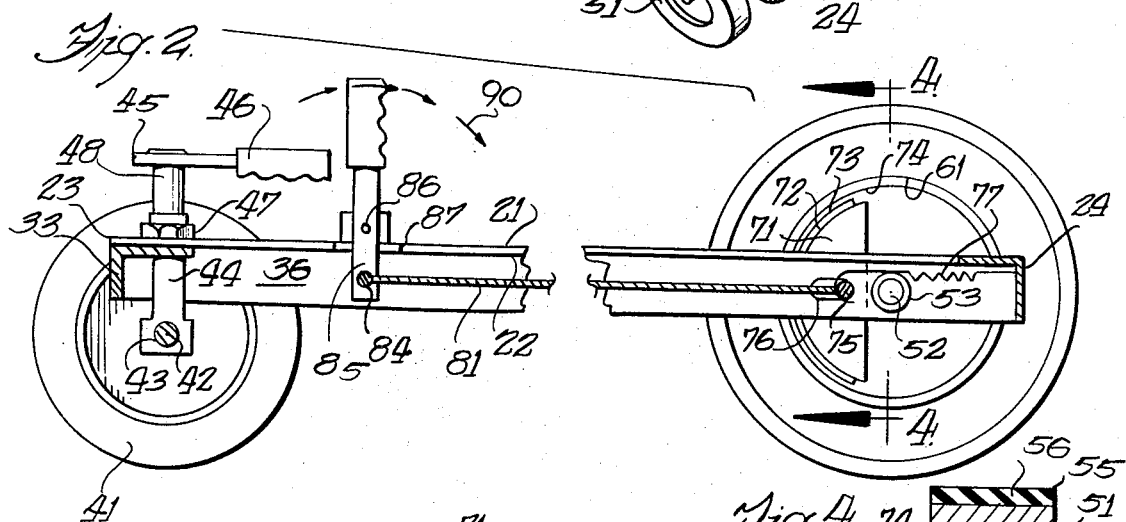
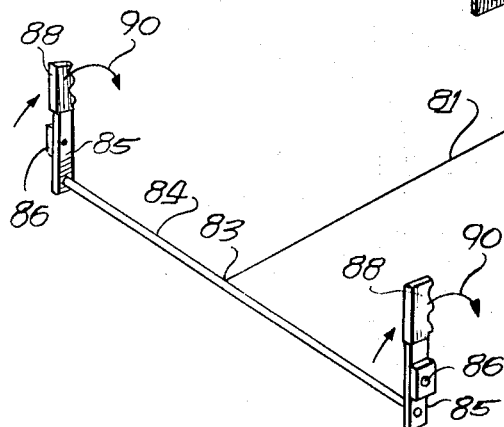
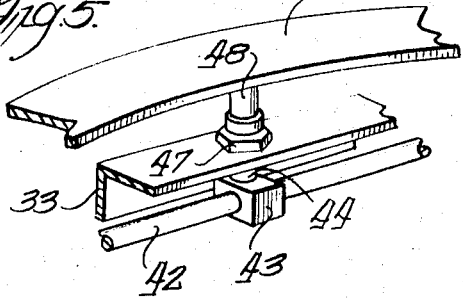

SIDEWALK COASTER SLED

BACKGROUND OF THE INVENTION

1. Field of the Invention

This invention relates generally to riding devices and more particularly to a novel sidewalk coaster sled intended for a child to use in riding along the sidewalk or other such surfaces in a manner similar to a sled but without requiring snow for the operation thereof, and including novel braking means associated therewith to assure the positive braking control of the coaster sled.

2. Description of the Prior Art

Sledding is one of the most popular winter activites among both children and adults, but most especially among younger children, with the difficulty in sledding being associated with the fact that sledding may only be done during the winter and then only when there is sufficient snow on the ground to support the runners of a sled.

Thus, while various toy riding cars, coasters, and the like are known in the prior art in various shapes and configurations, such do not provide the handling characteristics and feel of a sled when used on paved or unpaved surfaces, this thus severely limiting the exhilaration of sledding to winter months with snow on the ground.

It would thus be desirable to provide a vehicle which could be used without requiring snow on the ground, and which could be used under climatic conditions in a manner providing an exhilaration and feeling the same as an individual obtains from sledding, with such vehicle being controlled and reacting to such controls in a manner similar to that in which a sled would react on the snow.

SUMMARY OF THE INVENTION

The present invention recognizes the enjoyment of sledding and the plight of those enjoying the same being only able to achieve such enjoyment during the winter months, and then only when snow is on the ground sufficient to permit sledding, and as such provides a novel sidewalk coaster sled adapted to be used on paved and unpaved surfaces and which is utilized and controlled in a manner similar to a sled and provides the same feeling as sledding to an individual using the same.

It is a feature of the present invention to provide a wheeled coaster which simulates the operation and feeling of a sled.

A further feature of the present invention provides a sidewalk coaster sled in the form of a wheeled vehicle for use by children in the same manner as a sled would be used over the snow covered surfaces.

Still a further feature of the present invention provides a sidewalk coaster sled which is wheeled and steerable and which is provided with brakes which apply a force to the interior hub of a pair of the supporting wheels rather than against the rubber perimeter of such wheels as is done in prior art devices, this novel brake structure thus decreasing the wear on the tires providing an extended life of usage thereto.

The provision of a wheeled sidewalk coaster sled, such as briefly outlined above, and possessing the stated features and advantages, constitutes the principal features and advantages of the present invention. The provision of a wheeled sidewalk coaster sled which is relatively simple in its construction and which therefore may be readily manufactured at a cost only slightly higher than presently available sleds intended for use on snow covered surfaces; one which is rugged and durable and which therefore may be guaranteed by the manufacturer to provide a long lifetime of fun and enjoyment without maintenance and repair problems; one which is aesthetically pleasing and refined in appearance; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a wheeled sidewalk coaster sled constructed in accordance with the present invention;

FIG. 2 is a cross-sectional view taken along Line 2—2 of FIG. 1;

FIG. 3 is a fragmentary perspective view of the braking control system of the coaster sled;

FIG. 4 is a cross-sectional view taken along Line 4—4 of FIG. 2; and

FIG. 5 is an enlarged fragmentary perspective view of the handle bar connected to the front wheel axle in a manner to control the steering of the front wheels.

DESCRIPTION OF THE PREFERRED EMBODIMENT

Referring now to the drawings in detail there is illustrated a wheeled sidewalk coaster sled constructed in accordance with the principles of the present invention and designated in its entirety by the reference numeral 10.

The coaster sled 10 includes a substantially flat rectangularly elongated platform 11 having a top surface 21, a bottom surface 22, a front end edge 23, a back end edge 24, and opposed side edges 25 and 26. The platform 11 is supported on a frame 12 having spaced apart longitudinally extending side frame members 35 and 36 with the end portions thereof interconnected by laterally extending front frame member 33 and back frame member 34, the members 33–35 each having an L-shaped cross-section with the adjoining ends welded together to form the rectangular frame 12, the frame 12 being of a slightly lesser overall size than the platform 11 and being suitably mounted about the perimeter of the platform to support the same, such mounting being accomplished in any suitable manner, such as by screws, bolts and the like.

Associated with the front end portion of the platform 11 and spaced laterally outwardly from each side edge 25 and 26 thereof are a pair of laterally spaced apart wheels 41 each axially connected together by an axle 42 projecting laterally therebetween and disposed a distance spaced below frame front end 33, the midpoint of the axle having a mounting block 43 fastened thereto and having a shaft 44 extending vertically upwardly from the mounting block to terminate at the midpoint of a steering handle bar 45 which extends laterally in each direction therefrom with the end portions bent rearwardly and terminating in hand gripping portions 46, the shaft passing through aligned vertical openings provided in frame front end 33 in platform 11 and being rotatably secured thereto by a nut 47 and a hollow collar member 48 which fits about the shaft 44 and retains the handle bar 45 spaced upwardly from the platform 11.

A pair of laterally spaced apart wheels 51 are disposed at each side of the platform 11 adjacent the back end edge 24, the wheels rotatably mounted at the ends of a laterally extending axle 52 which is rotatably mounted in laterally aligned openings 53 in opposed side frame members 35 and 36 to permit rotation of the wheels relative to the frame. As seen in FIG. 4, each of the wheels 51 comprises a circular body member 54 which is preferably manufactured out of metal, such as steel, and having a friction surface 55 disposed about the outer peripheral edge 56 thereof, the friction surface preferably being a rubber or rubber like material for engaging the supporting surface when wheeling the sled 10 thereover. The body member 54 includes a central dividing radially extending support member 57 which is connected at its midpoint to the end of the axle 52, the support member 57 dividing the hub of the body member 54 into an inner hub portion 61 and an outer hub portion 62.

To provide a braking action on the free wheeling sidewalk coaster sled 10 there is provided a semicircular brake pad 71 associated with each of the wheels 51 and having a curved outer surface 72 of a curved configuration complementary to the curve of the inner hub section 61, a replacable friction brake lining 73 being suitably fastened to the curved surface 72 and adapted to engage the hub inner surface 61, it being understood that for maximum life it is preferred that the hub surface 61 be lined with a friction lining 74 as illustrated both to increase the life of the mutual friction linings as well as to provide a more stable and controllable braking action on the wheels 51. The brake pads 71 are interconnected by a laterally extending rod 75 which is slidable longitudinally of the platform 11 by being received in elongated transversely aligned slots 76 provided in opposed side frame members 35 and 36, the rod being oriented such that the curved outer surface 72 of the brake pads 71 are symmetrical about the side frame members and face forwardly of the platform. The rod 75 is connected by a pair of springs 77 to frame back end 24, the springs resiliently retaining the rod 75 rearwardly of slots 76 to retain the brake pads 71 out of engagement with the wheels 51. A flexible cable 81 has one end 82 connected to the midpoint of rod 75 with the opposite end 83 fixedly connected to the midpoint of a rod 84 which extends laterally of the platform 11 near the front end portion thereof, the ends of the rod 11 terminating in operating handles 85 which are each pivotally mounted by pivots 86 to the platform 11 with the handles 85 projecting vertically upwardly through elongated slots 87 provided in the platform 11 adjacent opposite side edges 25 and 26, the handles terminating in hand grip portions 88 adapted to be gripped in the hands of an individual when applying the brakes to the wheels 51.

The operation of the brake system is apparent from FIG. 3 of the drawings from which it is noted that moving the hand gripping portions 88 in a rearward direction, such as designated by arrows 90, effects the pivoting movement of the handle 85 about pivot point 86 in a manner to move rod 84 in a forward direction relative to the platform 11, this effecting through cable 81 the forward movement of rod 75 against the action of springs 77, this effecting the engagement of the brake pads 71 with the wheels 51 to effect a braking action on such wheels. Similarly, to release the brakes, the individual need only release the hand grip portions 88 at which time springs 77 will return rod 75 to the brake inoperative position rearwardly of slots 76 to disengage brake pads 71 from the brakes 51.

It is believed that the use and operation of the sidewalk coaster sled 10 is obvious in that the wheels 41 and 51 support the platform 11 in a manner to be rolled along any suitable supporting surface, either paved or unpaved, with the steering of the coaster sled being effected through use of handle bar 45 by an individual lying flat on the platform top surface 21, and with the brakes being operated by either or both of the handle members 85 which are rigidly interconnected by the rod 84 extending therebetween.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

I claim:

1. A sidewalk coaster sled intended for rolling along a suitable supporting surface comprising a platform having a top surface, a bottom surface, opposed front and back edges, and opposed side edges, a front pair of wheels interconnected at their axis by an axle extending therebetween, means rotatably mounting the axle to the platform beneath the bottom surface thereof in a manner permitting free rotative movement of the wheels in the general longitudinal direction of the platform, a handle bar disposed above the top surface of the platform near the front and edge thereof, means interconnecting the handle bar to the front wheel axle to effect the rotative movement of the axle between a front wheel normal straight-ahead position and angular positions relative thereto in a manner to effect the steering movement of the platform, a pair of laterally spaced apart back wheels, a back axle rotatably interconnecting the back wheels, means rotatably supporting the back axle beneath the platform bottom surface in a manner permitting free rotative movement of the back wheels in planes parallel to the longitudinal axis of the platform, each of the back wheels having an interior circular hub portion, a brake pad associated with each back wheel hub portion and adapted for movement into and out of engagement therewith, a brake pad rod interconnecting the brake pads and extending transversely of the platform, the brake pad rod being mounted for longitudinal movement forwardly and rearwardly of the platform, the rear most position of the brake pad rod defining the disengaged position between the brake pads and the wheel hub, forward longitudinal movement of the brake rod effecting the engagement of the brake pads with the wheel hub, spring means resiliently biasing the brake pad rod and connected brake pads in a manner to maintain the brake pads normally disengaged from the wheel hubs, said spring means normally biasing the brake pad rod in the rearmost position, a brake operating handle disposed forwardly of the platform and operatively connected to the brake pad rod to slectively effect movement thereof into a wheel hub engaging position to apply a braking force to the back wheels, the brake operating handle comprising a pair of laterally spaced apart and transversely aligned brake handles, each handle disposed adjacent an opposite side edge of the platform near the front end portion thereof, the brake handles each being identical and of an elongated configuration having their bottom ends projecting beneath the bottom surface of the platform and rigidly interconnected by a rod extending therebetween, the midportion of each brake handle being pivotally connected to the platform for swinging movement in a vertical plane about the horizontal axis of the pivot in a manner to effect the longitudinal forward and rearward movement of the handle rod, the top end of each handle member terminating in a hand grip portion adapted to be gripped in the hand of an individual to effect the movement of the associated handle member, and means interconnecting the handle rod with the brake rod for substantially equal and simultaneous movement in like directions by both rods whereby movement of the handle grip portions about their respective pivot points will effect forward movement of the handle rod which in turn will effect forward movement of the brake rod against the spring means to urge the brake pads into frictional engagement with the wheel hubs to apply a braking force thereto, the release of the brake handles permitting the springs to return the brake rod to the brake disengaging position rearwardly of the platform, such movement simultaneously returning the brake handles to their normal at rest positions.

2. The sidewalk coaster sled as set forth in claim 1 wherein each of the brake pads comprises a semicircular body member including an arcuately concavely shaped outer peripheral surface of a diameter substantially identical to the diameter of the wheel hub and adapted to frictionally engage the wheel hub over the substantial complete surface of the brake pad outer surface when moved into engagement with the wheel hub, and a friction lining interposed between the wheel hub and the brake pad outer curved surface.

3. The sidewalk coaster sled as set forth in claim 2 further comprising a pair of elongated rectangular slots disposed in the platform adjacent opposite side edges thereof, a handle associated with each of the slots, and the hand grip portion of each handle projecting upwardly through the associated slot for ready access above the top surface of the platform.

4. The sidewalk coaster sled as set forth in claim 3 further comprising a rectangular supporting frame having a pair of laterally spaced longitudinally extending side frame members, a front frame member, and a back frame member, the bottom surface of the platform fixedly mounted on the frame to overlie the same, the means rotatably supporting the back pair of wheels comprising laterally aligned openings in opposed side frame members adapted to rotatably receive the back wheel axle therethrough, a pair of laterally aligned longitudinally extending elongated slots disposed in the back end portion of each of the side frame members and adapted to freely receive therethrough associated end portions of the brake pad rod, the slots providing longitudinal guiding movement of the brake pad rod therethrough, and the spring means comprising a pair of laterally spaced apart longitudinally extending springs each having one end connected to the brake pad rod with the opposite end connected to the back frame end.

* * * * *